United States Patent [19]

Phy

[11] 4,058,899

[45] Nov. 22, 1977

[54] DEVICE FOR FORMING REFERENCE AXES ON AN IMAGE SENSOR ARRAY PACKAGE

[75] Inventor: William S. Phy, Los Altos, Calif.

[73] Assignee: Fairchild Camera and Instrument Corporation, Mountain View, Calif.

[21] Appl. No.: 716,915

[22] Filed: Aug. 23, 1976

[51] Int. Cl.$^2$ .............................................. B43L 11/00
[52] U.S. Cl. ...................................................... 33/26
[58] Field of Search ................. 32/32 R, 32 C, 32 D, 32/32 E, 32 F, 34, 35, 1 M, 78, 18 R, 26

[56] References Cited

U.S. PATENT DOCUMENTS

| 773,896 | 11/1904 | Richards | 33/26 |
|---|---|---|---|
| 1,113,404 | 10/1914 | Blair | 33/26 |
| 1,295,901 | 3/1919 | Johnson et al. | 33/35 |
| 1,424,941 | 8/1922 | Pirwitz | 33/20 R |
| 2,942,347 | 6/1960 | Kuhn | 33/78 |
| 3,876,301 | 4/1975 | Kosugi et al. | 33/1 M |

OTHER PUBLICATIONS

Charschan et al., "Laser Scribing Apparatus", Western Electric Technical Digest, No. 20, pp. 19–20, Oct. 1970.

Primary Examiner—Richard E. Aegerter
Assistant Examiner—John W. Shepperd
Attorney, Agent, or Firm—Alan H. MacPherson; Henry K. Woodward; Norman E. Reitz

[57] ABSTRACT

A device for forming reference axes on an image sensor package containing an image sensor array. The device comprises an optical means having a reticle formed therein, a movable table located in a plane parallel with the plane of the optical means, a scribe mounted between the movable table and the optical means and movable in a direction parallel with the reticle.

2 Claims, 2 Drawing Figures

DEVICE FOR FORMING REFERENCE AXES ON AN IMAGE SENSOR ARRAY PACKAGE

BACKGROUND OF THE INVENTION

1. Field of the Invention

This invention generally relates to the alignment of objects, and in particular to a device for forming alignment reference marks on a package containing an image sensor array.

2. Prior Art

With the recent introduction of small semiconductor imaging arrays, such as charge coupled device (CCD) imaging sensors, a problem of alignment of the array with other components in a system employing these sensors has arisen. The active area of these imaging sensors is extremely small, and alignment usually requires special equipment and a large amount of time.

SUMMARY OF THE INVENTION

A device is provided for forming a reference axis on an image sensor package containing an image sensor array comprising an optical means having a reticle formed therein, a movable table located in a plane parallel with the plane of the optical means, a scribe mounted between the movable table and the optical means and movable in a direction parallel with the reticle.

DETAILED DESCRIPTION

Figure 1:
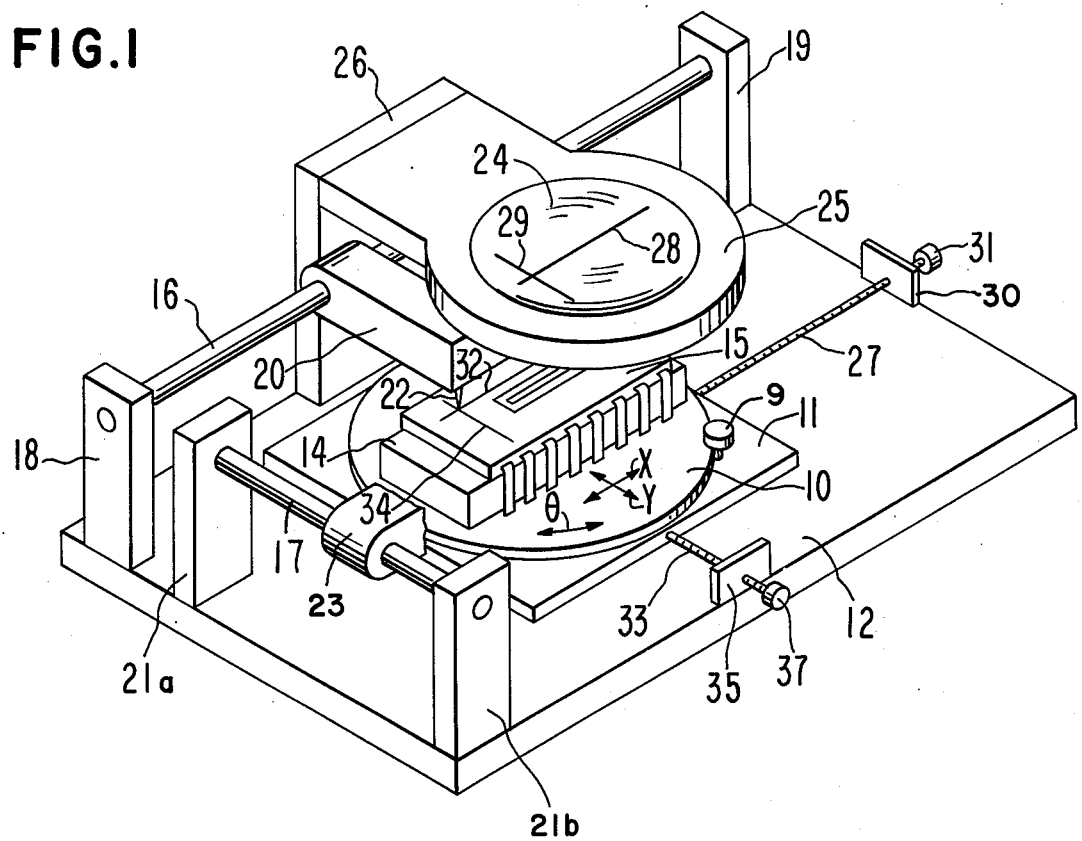
FIG. 1 is a perspective view of the structure of the present invention with an image sensor and package therefor mounted on movable tables; and, FIG. 2 is a top plan view of a typical image sensor array in a package therefor.

Referring now to the drawings and in particular to FIG. 1, a perspective view of the structure of the present invention is shown. A first movalbe table 10 is mounted on a second movable table 11, which is mounted on a platform 12. The movable table 10 can be rotated in a plane parallel with the plane of the platform 12 by means of a drive screw and knob 9. A mounting block 14 is located on table 10 for supporting an image sensor array package 15.

A first guide bar 16 is supported at either end by blocks 18 and 19, and a first scribe head 20 is slideably mounted on the guide bar 16. A scribe 22 is affixed to the end of the scribe head 20. Thus, the scribe and scribe head can move in only one direction, which is designated in FIG. 1 as the X axis.

A second guide bar 17 is supported at either end by blocks 21a and 21b, and a second scribe head 23 is slideably mounted on the second guide bar. A second scribe (not shown for clarity purposes, but identical to scribe 22) is affixed to the end of the scribe head 23. The second scribe and scribe head can move in only one direction, which is designated in FIG. 1 as the Y axis. It is noted, however, that the second scribe and scribe head are not necessary for the practice of this invention. Once a first reference axes is formed on the package 15, to be described further hereinbelow, the table 10 could be moved for alignment in the Y direction.

A lens 24 is mounted above the platform 12, and extended out over the movable tables by means of support blocks 25 and 26. The plane of the lens 24 is aligned parallel with the plane of the platform 12. Reticles 28 and 29 are formed in the lens 24 for visual alignment purposes, wherein reticle 28 is formed parallel to the indicated X axis and reticle 29 is formed perpendicular thereto, or parallel with the indicated Y axis. Also, guide bar 16 and reticle 28 are formed parallel to one another, and guide bar 17 and reticle 29 are likewise formed in a parallel arrangement.

The movalbe table 11 is free to move in the X and Y direction, and the table 10 is free to rotate at any angle ($\theta$) with respect to the X axis. In particular, a block 30 is affixed to one edge of the platform 12 and has a threaded opening therein for receiving an adjustment screw 27. A knob 31 is provided at one end of the screw 27 for rotation thereof, and the second end of the screw 27 is secured in an edge of the table 11. Thus, table 11 is moved in the X direction by rotation of the knob 31. In a similar manner, a block 35 is affixed to a second edge of the platform 12, and also has a threaded opening therein for receiving an adjustment screw 33. A knob 37 is affixed to one end of the screw 33 for rotation thereof, and the second end of the screw 33 is secured in another edge of the table 11. Accordingly, the table 11 may be moved in the Y direction by rotation of the knob 37. The table 10 can be rotated in the $\theta$ direction, as stated hereinabove, by rotation of the knob 9.

In operation, once the package 15 is secured to the block 14 the tables 10 and 11 are moved by means of knobs 9, 31 and 37 so as to align the active area of the sensor array with the reticles 28 and 29. Scribe head 20 is moved acorss the package 15 so that scribe 22 forms a reference line 32 on the surface of the package. Next, the scribe head 23 is moved across the package 15 to form a second reference line 34, which is perpendicular to he reference line 32.

Figure 2:
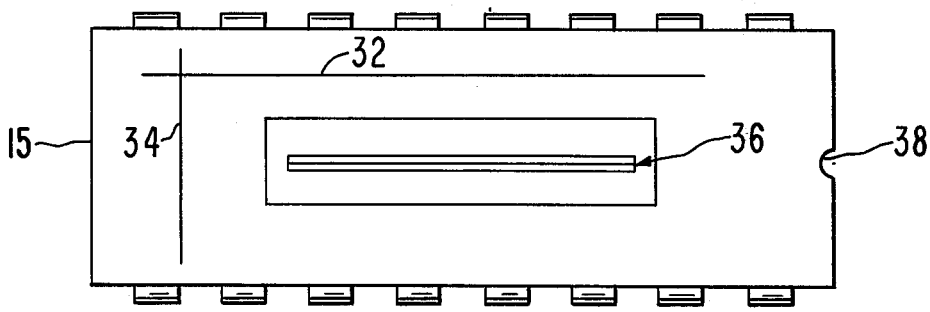

FIG. 2 illustrates a plan view of a typical image sensor array package 15. The active area 36 of th sensor is illustrated as a linear (single line) image array. However, the method and structure of the present invention may also be used to form reference axes on area image sensor array packages.

Accordingly, it may be seen from the description above that reference axes may be readily formed on a package housing an image sensor array, which axes are aligned parallel with and perpendicular to the active area of the array. Thus, the image sensor may be aligned easily with other components of a system employing such an array.

From the foregoing detailed description it will be evident that there are a number of changes, adaptations, and modifications of the present invention which comes within the provence of those skilled in the art; however, it is intended that all such variations not departing from the spirit and scope of the invention be considered as within the scope thereof as limited solely by the appended claims.

I claim:

1. A device for forming reference axes on a package containing an image sensor array, comprising:

a stable platform;

optical magnifiying means having two orthogonal reticles formed therein, said optical means being fixedly attached to said stable platform in a plane parallel to the plane of said platform;

a first table movably mounted on said stable platform, said first table having means to produce movement in two linear mutually orthogonal directions, said directions being parallel to said orthogonal reticles, said first table being mounted in a plane parallel to the plane of said platform;

a second able rotatably mounted on said first table, said second table being mounted in a plane parallel to the plane of said platform, said second table being adapted to receive said image sensor array;

first and second guide means mounted on said stable platform, said guide means being parallel to said orthogonal reticles; and, first and second scribe means slidably mounted on respective ones of said guide means projecting from said guide means for overlying said second table for inscription of orthogonal reference axes on an image sensor array.

2. The device of claim 1 wherein said optical means comprises a monocular which permits inscription of reference axes on image sensor arrays with minimal parallax error.

* * * * *